UNITED STATES PATENT OFFICE.

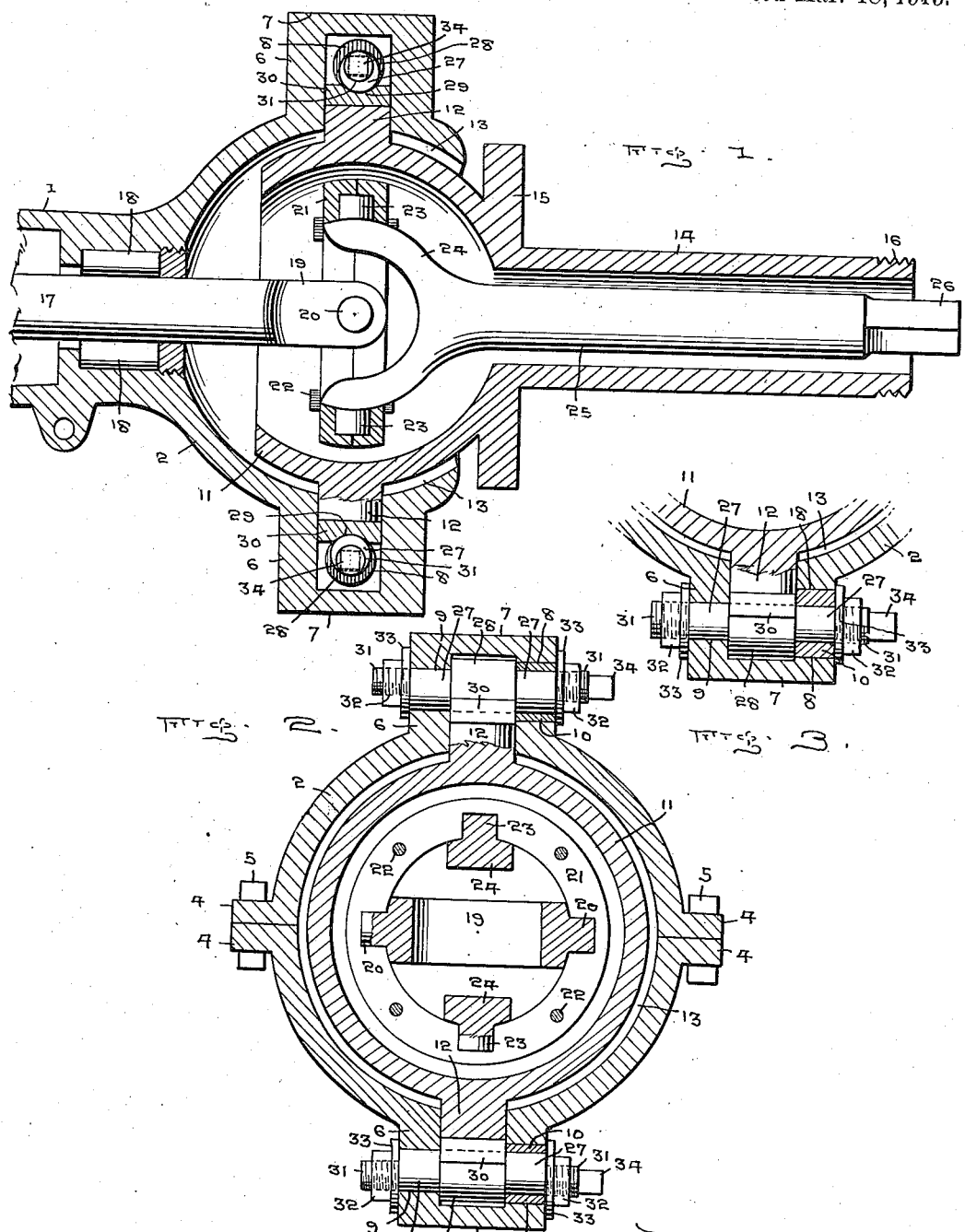

WILLIAM AUGUST BESSERDICH, OF CLINTONVILLE, WISCONSIN.

STEERING MECHANISM FOR FOUR-WHEEL-DRIVE VEHICLES.

1,297,962. Specification of Letters Patent. Patented Mar. 18, 1919.

Application filed January 31, 1917. Serial No. 145,688.

*To all whom it may concern:*

Be it known that I, WILLIAM A. BESSER-DICH, a citizen of the United States, residing at Clintonville, in the county of Waupaca and State of Wisconsin, have invented certain new and useful Improvements in Steering Mechanism for Four-Wheel-Drive Vehicles; and I do hereby declare the following to be a full, clear, and exact description of the invention, such as will enable others skilled in the art to which it appertains to make and use the same.

My invention relates to an improved steering mechanism for four wheel drive vehicles, and is primarily intended for use upon automobile trucks and like vehicles.

One of the objects of my invention is the provision of a hollow front axle provided with shafts having a universal joint connection and which shafts are adapted to be driven by the source of power upon the vehicle for driving the front wheels of the vehicle.

Another object of my invention is the provision of a housing for the universal joint, the housing being constructed in such a manner that the front wheels of the vehicle may be readily guided by the steering devices upon the vehicle.

A further object of my invention is to provide a housing consisting of two casings one operatively positioned within the other in a manner to provide for the actuation of the stub axle for guiding the front wheels of the vehicle.

A still further object of my invention is the provision of means within the housing for adjusting the casings relative to each other for maintaining certain of the surfaces thereof out of contact with each other to provide for the freedom of movement of the stub axles and to guard against binding action of the contiguous surfaces of the casings which may be due to any cause.

These and other objects and advantages of my invention will become more apparent as the nature of the invention is more clearly understood from the combination and arrangement of the parts as set forth in the following specification, defined in the appended claims, and illustrated in the accompanying drawings, in which, Figure 1 is a vertical longitudinal sectional view of my invention, showing the detailed construction and the manner of assembling the parts thereof.

Fig. 2 is a vertical transverse sectional view of my invention, showing further detailed construction of the parts shown in Fig. 1.

Fig. 3 is a fragmentary detailed sectional view showing a slight change in the form of the adjusting means which I may employ.

Referring to the drawings, wherein like reference characters indicate corresponding parts throughout the several views, 1 denotes the hollow or tubular front axle provided upon each of its ends with the substantially spherical casings 2, there being only one end of the axle 1 shown in the drawings and is considered sufficient for illustrating my invention. The axle 1 and the casing 2 are longitudinally divided so as to provide an upper section and a lower section, each of the sections being provided at their meeting edges with any desired number of the apertured ears 4, through which are adapted to pass the bolts 5 for securing upper and lower sections of the axle 1 and its casings 2 together in operative relation.

The casing 2 is formed with the diametrically oppositely disposed hollow bosses 6 formed with the closed end or caps 7. Formed through the side walls of the bosses 6 are the oppositely disposed alined openings 8 and 9. The openings 8 and 9 are preferably circular, the opening 8, however, being of greater diameter than the openings 9 so that there can be seated within the openings 8 the bushings 10; the functions of the openings 8 and 9 and the bushing 10 will be hereinafter described.

Operatively positioned within the outer casing 2 is the inner casing 11 provided with the diametrically oppositely and outwardly disposed trunnions 12, the trunnions 12 projecting for a distance into the hollow bosses of the outer casing 2 for rotatably mounting the inner casing 11 within the outer casing 2. The inner casing 11 is of sufficiently less diameter than the outer casing 2, so that when the inner casing 11 is operatively positioned within the outer casing 2 the outer walls of the inner casing 11 will be spaced from the inner walls of the outer casing 2 as indicated by the space 13 intervening between the respective adjacent surfaces of the casings 11 and 2. Projecting from one side of the inner casing 11 is the tubular extension or stub axle 14 provided with the shoulder or collar 15 at its inner end and the threaded portion 16 at its outer end adapted to receive any suitable form of retaining nut for securing the hub of the wheel (not shown) in operative position upon the tubular extension or stub axle 14.

Within the axle 1 is operatively positioned the shaft 17, preferably mounted in the roller bearings 18 suitably housed within the axle 1, and upon the end of the shaft 17 which projects into the inner casing 11 is formed the fork or yoke 19 provided upon the outer surfaces of its ends with the oppositely disposed trunnions 20 which are seated in a pair of oppositely disposed recesses of the sectional or split ring 21, the sections of the split ring 21 being secured together through the medium of the bolts 22 for operatively securing the trunnions 20 of the shaft 17 in the recesses thereof. Within the alternate pair of the oppositely disposed recesses within the sectional rings 21 are operatively mounted the outwardly projecting trunnions 23 formed upon the fork or yoke 24 of the stub shaft 25 which projects through the tubular extension or stub axle 14 and has upon its projecting end the squared end 26 adapted to be seated within a square socket or recess of a connecting member (not shown), which connecting member is also connected with the hub of the wheel (also not shown), so that, when the shaft 17 is driven by the motive power upon the vehicle in any suitable and desirable manner the power will be transmitted to the stub shaft by the universal joint connection between the shafts 17 and 25 and through the member connecting the end 26 of the stub shaft 25 with the hub of the wheel whereby the front wheels of the vehicle are driven.

In order to adjustably maintain the inner casing 11 in spaced operative position within the outer casing 2 I preferably mount within the hollow bosses 6 of the outer casing 2 the rotatable adjusting members. These rotatable adjusting members consist of the shafts 27 journaled in the bushings 10 and the openings 9 of the bosses 6 and formed centrally upon the shafts 27 are the cams 28 adapted to be seated in the concaved recesses 29 of the wear plates 30 which are interposed between the cams 28 and the ends of the trunnions 12 of the inner casing 11. For rotating the shafts 27 for actuating the cams 28, the ends of the shafts 27 are provided with the threaded stems 31 upon which are threaded the retaining nuts 32 which bind against the washers 33 upon each side of the bosses 6, the washers 33 providing bearing members for the nuts 32 and also efficient dust excluding members.

The screw threaded stems 31 are preferably disposed upon the ends of the shafts 27 at a point somewhat off the longitudinal center of the shafts 27 and preferably at the side of the center of the shafts 27 or near the major radii of the cams 28, so that when a suitable wrench or other tool is applied to the squared ends 34 upon one of the threaded stems 31 of the shafts 27 there will be a double cam action exerted upon the wear plates 30 when the shafts 27 are revolved for adjusting the inner casing 11 within the outer casing 2 and thereafter the nuts 32 are tightened, which have been previously loosened for the adjustment, for securing the shafts 27 and cams 28 in their fixed adjusted positions.

In Fig. 3 is shown a slightly different arrangement of the parts of the rotatable adjusting members, and wherein the shafts 27 have their screw threaded stems 31 disposed upon the ends of the shafts 27 at the longitudinal centers of the shafts 27 so that when a wrench or other tool is applied to the square end 34 of the shaft 27 of Fig. 3 the stems 31 are revolved at the longitudinal axis of the shafts 27, while the stems 31, as shown in Figs. 1 and 2 at one side of the longitudinal axis of the shafts 27, are swung around the axes of the shafts 27 thereby affording a better lever action than that attained by having the threaded stems along the axis of the shafts 27 as in Fig. 3.

Having described my invention, what I claim as new and desire to secure by Letters Patent, is:—

1. A spherical housing for a universal joint comprising an outer casing having bosses, an inner casing having trunnions disposed within said bosses, tubular extensions upon said casings, and rotatable members disposed within said bosses at a right angle to the vertical axes of said trunnions and operatively connected therewith for maintaining said casings out of contact with each other.

2. A spherical housing for a universal joint comprising an outer casing having bosses, an inner casing having trunnions disposed within said bosses, tubular extensions upon said casings, rotatable members disposed within said bosses at a right angle to the vertical axes of said trunnions and operatively connected therewith for maintaining said casings out of contact with each other, and non-circular heads provided upon said rotatable members to operate the same.

3. A spherical housing for a universal joint comprising an outer casing having bosses provided with transverse openings therein, an inner casing having trunnions disposed within said bosses, and adjusting members rotatably mounted within said transverse openings and operatively connected with the trunnions within said bosses.

4. A spherical housing for a universal joint comprising an outer casing having bosses provided with transverse openings therein, an inner casing having trunnions disposed within said bosses, adjusting members rotatably mounted within said transverse openings and operatively connected with the trunnions within said bosses, and wear plates disposed between said adjusting members and said trunnions.

5. A spherical housing for a universal joint comprising an outer casing having bosses, an inner casing having trunnions disposed within said bosses, tubular extensions upon said casings, shafts rotatably mounted in said bosses, and cam means upon said shafts operatively connected with said trunnions to adjustably maintain the inner casing in spaced relation to the outer casing.

6. A spherical housing for a universal joint comprising an outer casing having bosses, an inner casing having trunnions disposed within said bosses, tubular extensions upon said casings, shafts rotatably mounted in said bosses, cam means upon said shafts operatively connected with said trunnions to adjustably maintain the inner casing in spaced relation to the outer casing, means for rotating said shafts, and means for maintaining said shafts in adjusted position.

7. A spherical housing for a universal joint comprising an outer casing having bosses provided with transverse openings therein, an inner casing having trunnions disposed within said bosses, shafts rotatably mounted within the openings of said bosses and provided with threaded stems at each end, cam means disposed on said shafts, means for rotating said shafts, and lock nuts disposed upon the opposite ends of said shafts for retaining them in adjusted position.

In testimony whereof I have signed my name to this specification in the presence of two subscribing witnesses.

WILLIAM AUGUST BESSERDICH.

Witnesses:
C. E. GIBSON,
E. E. LARSON.